United States Patent [19]
Schneider

[11] Patent Number: 5,405,539
[45] Date of Patent: Apr. 11, 1995

[54] STORM DRAIN FILTER SYSTEM

[76] Inventor: Thomas W. Schneider, 2912 Brookview, Plano, Tex. 75074

[21] Appl. No.: 27,113

[22] Filed: Mar. 4, 1993

[51] Int. Cl.⁶ .............................................. B01D 35/02
[52] U.S. Cl. ........................... 210/747; 210/163; 210/170; 210/434; 210/455; 210/480
[58] Field of Search ............... 210/747, 767, 790, 162, 210/163, 164, 170, 434, 455, 477, 479, 480, 482, 499; 404/4, 5

[56] References Cited

U.S. PATENT DOCUMENTS

| | | | |
|---|---|---|---|
| 114,270 | 5/1871 | Dark | 210/163 |
| 122,209 | 12/1871 | Ashman et al. | 210/163 |
| 185,017 | 12/1876 | Dark | 210/163 |
| 232,948 | 10/1880 | Dernham | 210/163 |
| 783,556 | 2/1905 | Van Buskirk | 210/163 |
| 1,060,338 | 4/1913 | Gschwind | 210/164 |
| 2,102,310 | 12/1937 | Egan | 210/153 |
| 2,182,795 | 12/1939 | Day | 210/164 |
| 2,615,526 | 10/1952 | Lane | 210/164 |
| 3,881,832 | 5/1975 | Maguire | 404/4 |
| 4,419,232 | 12/1983 | Arntyr et al. | 210/164 |
| 4,793,728 | 12/1988 | Ellis | 404/2 |
| 4,871,454 | 10/1989 | Lott | 210/455 |
| 4,986,693 | 1/1991 | Salberg et al. | 404/4 |
| 5,066,165 | 11/1991 | Wofford et al. | 404/4 |
| 5,069,781 | 12/1991 | Wilkes | 210/164 |
| 5,133,619 | 7/1992 | Murfae et al. | 404/4 |
| 5,232,587 | 8/1993 | Hegemier et al. | 210/170 |

Primary Examiner—Christopher Upton
Attorney, Agent, or Firm—Richards, Medlock & Andrews

[57] ABSTRACT

A filter system for insertion and assembly in a storm drain collection box. The filter includes a frame having a removable back and legs for easy assembly in the storm drain collection box. The frame includes a bed portion which is telescopic so as to be expandable to accommodate the width of the collection box. A sheet of filter medium is placed on the filter bed and back, and the filter frame is then urged against the front of the collection box by pneumatic cylinders. Silt and other debris collects in the filter compartment until full, and then the excess drainage water overflows unrestricted over the back of the filter frame.

23 Claims, 3 Drawing Sheets

STORM DRAIN FILTER SYSTEM

TECHNICAL FIELD OF THE INVENTION

The invention relates in general to waste water drainage systems, and more particularly to methods and apparatus utilized in storm drains for filtering the drainage water.

BACKGROUND OF THE INVENTION

City streets and highways utilize gutters and storm drains to remove runoff water so that such routes are maintained in a good driving condition. The drain water collected in the storm sewers is generally carried by underground drainage systems to water shed areas, such as creeks, lakes, rivers, etc. The drainage water carries with it all objects that float as well as objects that are forcefully carried by the currents of the drainage water.

The debris carried by runoff or drainage water into the drainage system is either carried downstream by the water or, if large enough, becomes obstructed in irregularities of the drainage system. For example, the street runoff water that is carried along a curb and into a storm drain, and particularly through a collection box that is constructed below the street level, often lodges therein and forms obstructions for other debris. Larger objects that first become obstructed in the system collect other smaller objects that cannot pass therethrough, and the smaller objects then obstruct yet other smaller objects, and so on until the system becomes completely clogged. If the flow of drain waiter through any part or portion of the drainage system becomes obstructed, the flow rate is reduced, thereby placing additional constraints on other parts of the drainage system. If the blockage or obstruction of the drainage system is not eventually alleviated, flooding and unsafe conditions can result. Cities and highway departments employ maintenance crews for cleaning out and maintaining the storm drain systems in proper operating conditions. It can be appreciated that substantial revenue is required for this purpose alone.

Governmental regulations have recently placed additional constraints on the capability of storm drains, and the like, for carrying silt, sediment and other small-sized earth material. For example, regulations now require that in areas of new construction no silt or sediment particles can be passed through a storm drain and into the downstream rivers or tributaries. These regulations place severe constraints on municipalities in the consideration of areas not yet completely developed, as well as new areas yet to be developed. It is further believed that these constraints will eventually be applied to exiting drainage systems.

Various filter systems have been proposed for use in storm drain systems. In U.S. Pat. No. 122,209 by Ashman et al., an iron grate is installed in a catch basin for removing sticks and other large-sized articles. When the grate becomes filled with objects, the water flows through a peripheral grate area and through the catch basin to the outlet. As can be appreciated, because of the large spacing between the bars of the iron grate, such a system is not effective to remove small-sized particles such as silt.

In U.S. Pat. No. 5,133,619 by Murfae et al., a water filtration system is connected in series with a conventional storm drain system. The filtration system includes a filter basin with a charcoal filter, and a filter basket insertable into the basin. The basket is filled with sand or other fine material. When the filter basket becomes full, a hinged door automatically closes and the drainage water is diverted and proceeds down the gutter to the conventional storm drain inlet where it is carried therethrough to the underground system. The water filtration system of the noted patent can be utilized only in new construction areas as it is not retrofittable into a conventional storm drain system without substantial cost. Such a drain system does not efficiently utilize space, as it is installed upstream from a conventional storm drain system. Also, costly motorized fork lift equipment is required to remove the filter basket and the collected debris and recharge it with a new filter material.

From the foregoing, it can be seen that a need exists for a storm drain filter that can be disassembled and inserted through a curb drain inlet, and easily and quickly installed in the collection box of a conventional storm drain. Another need exists for a storm drain filter that can be easily cleaned without requiring heavy equipment or substantial time. Another need exists for a large-area filter that can remove very small particles such as silt, but yet achieve a high flow rate to accommodate a substantial volume of drainage water. These and other needs are fulfilled by the storm drain filter of the invention as described in more detail below.

SUMMARY OF THE INVENTION

In accordance with an important feature of the invention, the filter system is constructed in multiple parts that can be passed through a gutter inlet and assembled in the collection box of the storm drain. The filter includes a multi-part tubular frame that can be quickly assembled in the collection box. The frame is constructed so that it can be fully expanded between the internal sidewalls and butted against a front wall of the collection box. The frame is telescopic to accommodate collection boxes of different sizes and includes legs attachable thereto for supporting a filter bed portion and a filter back portion of the frame above the floor of the collection box. In this regard, the filter achieves the shape similar to a bench. A coarse screen is then laid on the bed of the filter, as well as fastened against the back portion of the filter. The screen is perforated to filter particles of a certain size, or if exceptionally small size articles such as silt are to be filtered, a sheet of woven filter material is laid over the screen on the bed and back portions of the filter frame. In this latter instance, the coarse screen functions as a support for the woven filter material. Preferably, the filter material is draped over the frontal and side edges of the filter bed, with a seal material attached between the woven filter material and the frontal and side edges of the frame. The filter material is also draped over the top edge of the back of the filter.

Once the filter bed and filter medium is situated in the collection box, the frame is fully expanded laterally for sealing against the sidewalls of the collection box. In addition, the filter frame is urged against the frontal sidewall of the collection box and maintained in such position. The frame position is maintained, preferably by pneumatic cylinders actuated laterally between the filter bed and the back wall of the collection box. By expanding the pneumatic cylinders with compressed air, the filter frame is pushed tightly against the front wall of the collection box and maintained in such position. Pneumatic cylinders are also actuated between the filter bed and the sidewall of the collection box to fix the filter in a transverse manner in the collection box.

A substantial space exists between the upright back of the filter and the back wall of the collection box for spillover of drainage water when the filter compartment becomes filled with debris.

The removal of the debris collected in the filter can be accomplished by a person entering the collection box via the conventional manhole and physically removing the larger-sized items through the manhole or the gutter opening. The smaller-sized objects can be removed by the person deactivating the pneumatic cylinders, loosening the woven filter material from the frame, and removing the filter material with the debris captured therein.

BRIEF DESCRIPTION OF THE DRAWINGS

Further features and advantages of the preferred and other embodiments of the invention will become apparent from the following and more particular description of the invention, as illustrated in the accompanying drawings, where like reference characters generally denote similar elements throughout the views, and in which.

DETAILED DESCRIPTION OF THE INVENTION

Figure 1:
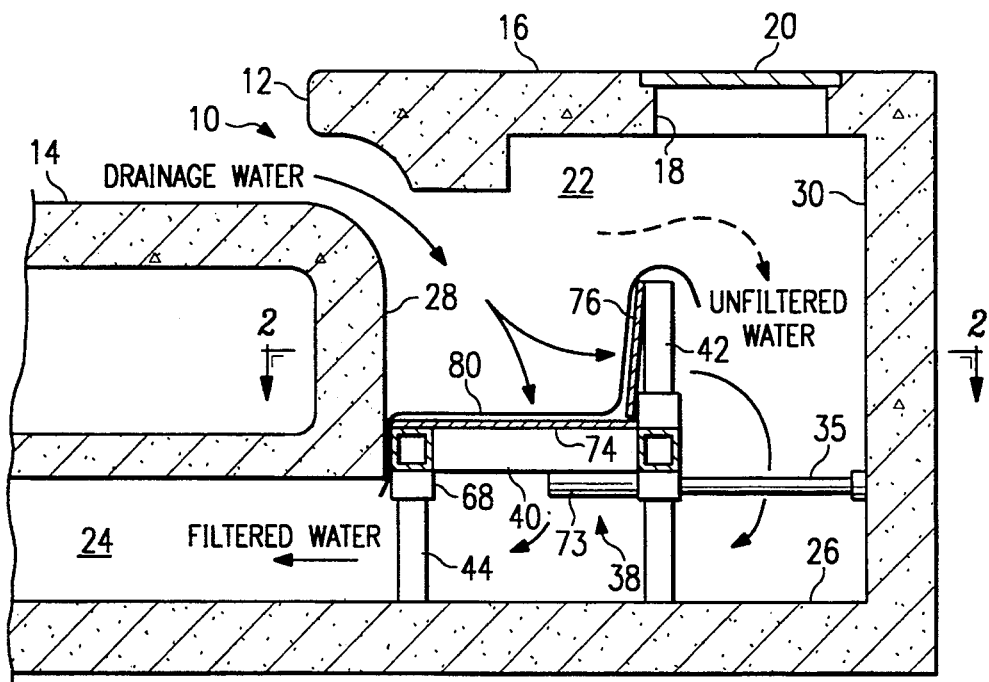
FIG. 1 is a side sectional view of a standard collection box and drainage system with the filter of the invention assembled therein.

FIG. 1 illustrates a storm drain of conventional construction. The storm drain includes an inlet 10 formed as an opening between a curb 12 and the gutter 14. Storm drain inlets are generally about six inches in height and range in lengths from five to ten feet. The upper sidewalk surface 16 often includes an opening 18 covered by a manhole cover 20 or other access cover. A collection box 22 comprises a vault having the upper drainage water inlet 10 and a lower outlet 24. The outlet 24 may be a concrete or tile drainpipe or other drainage conduit. The collection box 22 includes a concrete floor 26, a front wall 28, a back wall 30, as well as opposing sidewalls 32 and 34 shown in FIG. 2. In storm drains not equipped with a filter, large-sized debris that cannot pass through the outlet 24 collects in the collection box 22 and obstructs other smaller-sized debris, until eventually the system becomes plugged.

Figure 2:
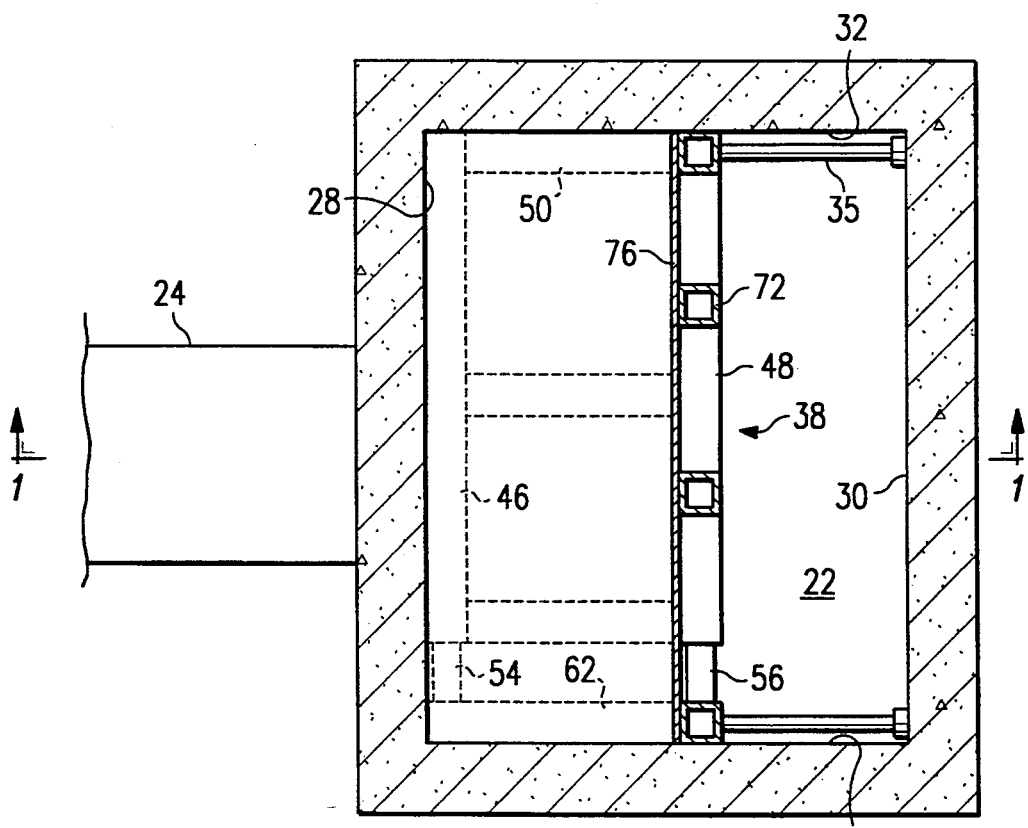
FIG. 2 is a top sectional view, taken along line 2—2 of FIG. 1, illustrating the filter compartment and the overflow area.

The filter system of the invention is shown in FIGS. 1 and 2 installed in the collection box 22 of the storm drain. The filter includes a multi-part 38 frame that is portable and can be passed through the inlet 10 and assembled in the collection box 22. In the preferred embodiment of the invention, the frame 38 is constructed of square tubular steel, and includes a bed 40 that is flat and disposed laterally in the collection box. The frame also includes an upright back 42. When assembled together, the bed 40 and the back 42 resemble a bench-type seat. Plural legs, such as shown by reference numeral 44, support the filter bed 40 above the floor 26 of the collection box 22. As noted in FIG. 1, the bed 40 of the filter is situated against the front wall 28 of the collection box 22, while the opposing side edges of the bed 40 are expanded to extend between the sidewalls 32 and 34 of the collection box 22. A number of pneumatic actuated cylinders 35 are attacked to the filter frame and extendable for engaging sidewalls of the collection box to fix the filter system therein.

Figure 3:
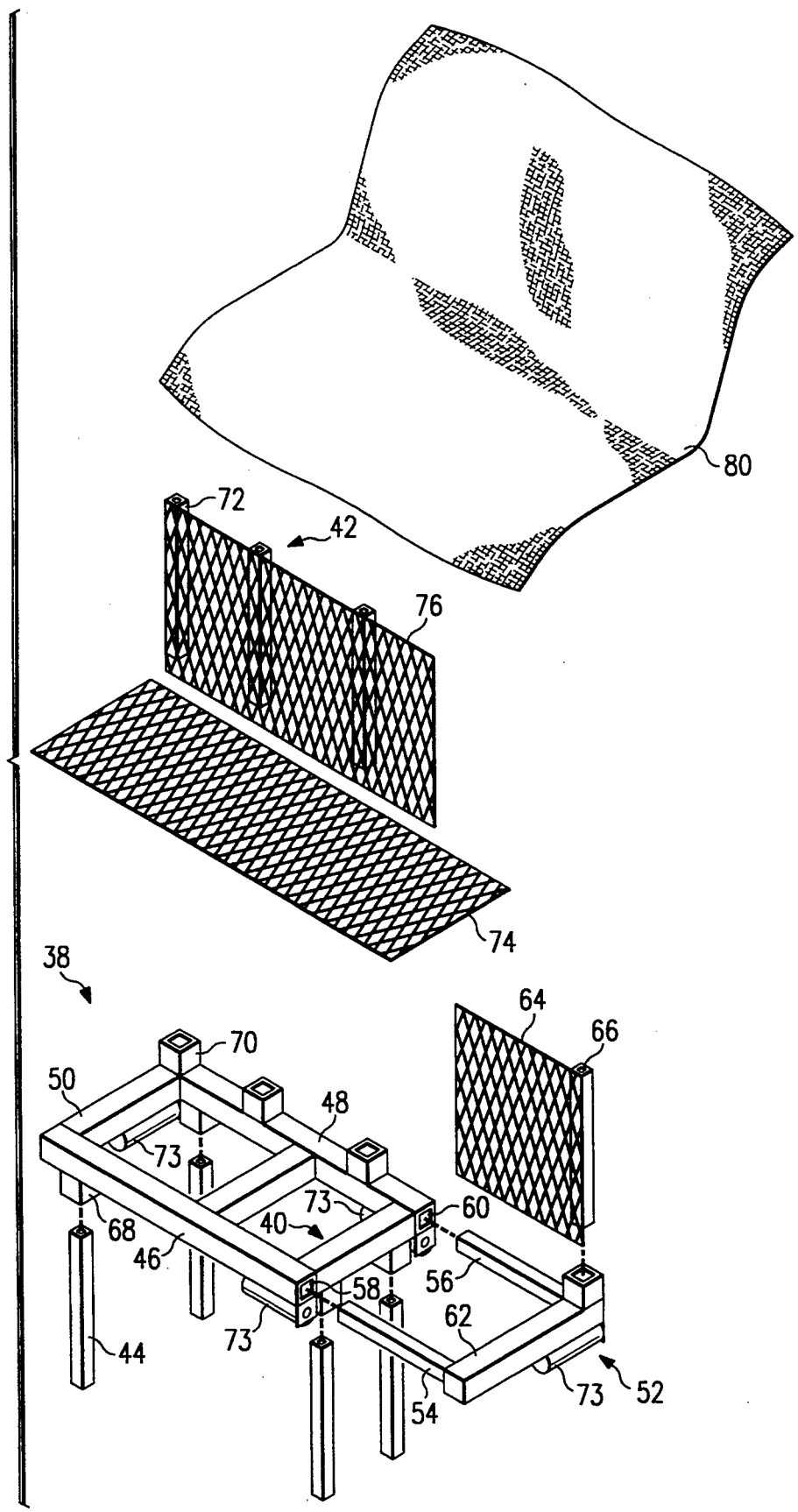
FIG. 3 is an exploded view of the filter frame of the invention with the coarse screen and the woven filter material removed upwardly therefrom.

The filter frame 38 is shown in exploded form in FIG. 3. As noted above, the filter bed 40 is constructed of square tubular steel, including front and back members 46 and 48 with cross supports 50 welded therebetween. Three cross supports 50 are shown, it being realized that any number can be used depending on the strength and rigidity required of the load to be supported thereon. The filter bed 40 also includes a telescopic portion 52 including smaller spaced-apart tubular members 54 and 56 that are insertable into the respective open ends 58 and 60 of the front and back frame members 46 and 48. The smaller tubular inserts 54 and 56 are welded to a cross support 62.

The dimensions of the filter frame 38 can be chosen to accommodate collection boxes of different styles and shapes. In the preferred embodiment, the bed is about 24 inches from front to back for fitting in a 30 inch collection box 22. The longer dimension of the bed is expandable to about ten feet. The filter back 42 is 18 inches high and the same length as the frame bed 40. With these dimensions, about 35 square feet of filter area is provided. With a front-to-back frame dimension of the bed being about two feet, a space of about six inches is left between the frame 38 and the back wall 30 of the collection box. This space serves as an unobstructed channel for the overflow of drainage water and debris should the filter compartment become full of silt and trash.

The filter bed 40 has welded thereto a number of tubular stub sections 68 for insertion therein of corresponding legs 44. Four stub sections 68 and corresponding legs 44 are shown; other legs can be utilized depending on the amount of support required. Also, the telescopic section 52 can be equipped with similar stub sections and corresponding legs to support the extended part of the filter bed 40. A number of upper support stubs 70 are welded to the back bed member 48 for insertion therein of corresponding upright back members 72. As noted in FIG. 3, the telescopic section also includes an upper stub and corresponding upright member so as to define a back part of the filter that extends completely between the sidewalls of the collection box 22. As can be appreciated, the multi-part tubular filter frame 38 can be inserted through the curb inlet 10 into the collection box 22 and fully assembled therein. Welded to the filter bed 40 and the telescopic section 52 are a number of pneumatic cylinder mounts, shown as reference character 73. The cylinder mounts will be described in more detail below.

Shown in a position removed from the tubular filter frame 38 is illustrated a bed screen 74 and a back screen 76. The bed screen 74 is laid on the bed 40 of the filter while the back screen 76 is attached by screws, welding or other hardware to the upright supports 72. A back screen 64 and associated upright 66 are also attached to a support stub in the telescopic section 52. The screens may be of the type having a particular mesh dimension so as to remove objects of a desired size from the drain water. In the preferred embodiment, the screen material is formed of expanded sheet metal and functions as a support for a woven filter material to be described below. The screens 74 and 76 may each consist of different screen sections so as to overlay and yet extend the full width of the collection box. In addition, the bed screen 74 can be permanently welded to the filter bed frame 40 and the back screen 76 can be permanently welded to the upright supports 72, with additional screens later fixed to the telescopic section 52 of the filter frame. In the preferred embodiment of the invention, the screens 74 and 76 are of the expanded metal type, providing support for yet a finer woven material shown removed and identified as reference numeral 80. In the preferred embodiment of the invention, the fine filter material 80 is of the woven synthetic type adapted for removing particles as small as 42 microns in diameter. Such a material is identified as polyfelt type TS480 or TS500, obtainable from American Excelsior, Dallas, Tex. This filter material is characterized by a large flow rate, although other woven or nonwoven filter materials can be used with equal effectiveness. The sheet of woven material 80 is of a length sufficient to cover the bed 40 and the back 42 of the filter frame 38 as well as excess for overlap at the edges of the frame. In like manner, the width of the woven filter material 80 should be sufficient to be folded over the side edges of the filter bed 40. The overlap at the front of the frame is shown more clearly in FIG. 1.

While the filter frame 38 is illustrated as being of a multi-part construction for assembly and disassembly, it is contemplated that the frame 38 can be made as a single unit and made integral with the collection box during the fabrication thereof. In other words, many parts of the filter frame illustrated above can be constructed integral with the concrete walls of the collection box.

Figure 4:
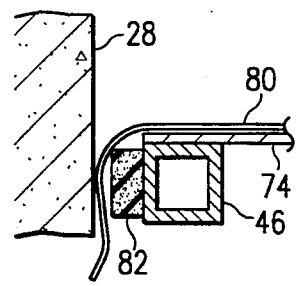
FIG. 4 is a partial sectional view of the filter frame sealed to a front wall of the concrete collection box.

The assembly of the filter of the invention is carried out in the collection box 22 in the following manner. First, the parts of the filter system are inserted through the gutter opening 10 into the collection box 22. The filter frame 38 is then assembled in the manner shown in FIG. 3, with the tubular inserts 54 and 56 inserted into the ends 58 and 60 of the filter bed 40. The bed legs 44 and the uprights 72 and attached screen 76 of the back 42 are installed in the corresponding lower and upper stub sections 68 and 70. The bottom screen section 74 is then laid on the frame bed 40. A seal (not shown), such as a two-pound foam material that is about one-half inch thick is adhesively attached around the front and side edges of the frame bed 40. The woven filter material 80 is then laid over the filter bed 40 and filter back 42 and overlapped over the back 42 and the front edge of the filter bed 40, as shown in FIG. 1. Further, the woven filter material 80 is overlapped over the side edges of the filter bed and the telescopic extension 52 thereof. Next, the filter frame is pushed against the front wall 28 of the collection box 22, with the woven filter material 80 and foam seal pinched therebetween. When the foam seal material is disposed on the inner surface of the woven filter material 80, the foam need not function as part of the filter, but rather functions as a seal so that the filter material is pushed tightly against the concrete walls of the collection box 22. The filter bed 40 is pushed against the sidewall 32, with the foam seal material functioning to seal the filter material 80 to the collection box walls. The seal arrangement is shown in FIG. 4, with the foam seal shown as reference character 82. In like manner, the telescopic section 52 is expanded so as to seal the woven filter material 80 to the other sidewall 34.

The entire filter frame 38 is then fixed within the collection box 22, using the pneumatic cylinders that are fastened to the filter frame 38. A source of compressed air is coupled to the pneumatic cylinders 35 to urge the filter frame 38 tightly against the front wall 28 of the collection box 22. Pneumatic cylinders suitable for use with the invention can be obtained from Four-O Fluid Power Sales, Fort Worth, Tex., and identified as Model No. Schrader #1.06DSR12.00. Once actuated, the pneumatic cylinders fix the filter system between the four sidewalls of the collection box 22. Once the source of compressed air is removed from the pneumatic cylinders, the cylinders remain in the extended position. The installation of the filter system of the invention is thus completed.

Figure 5:
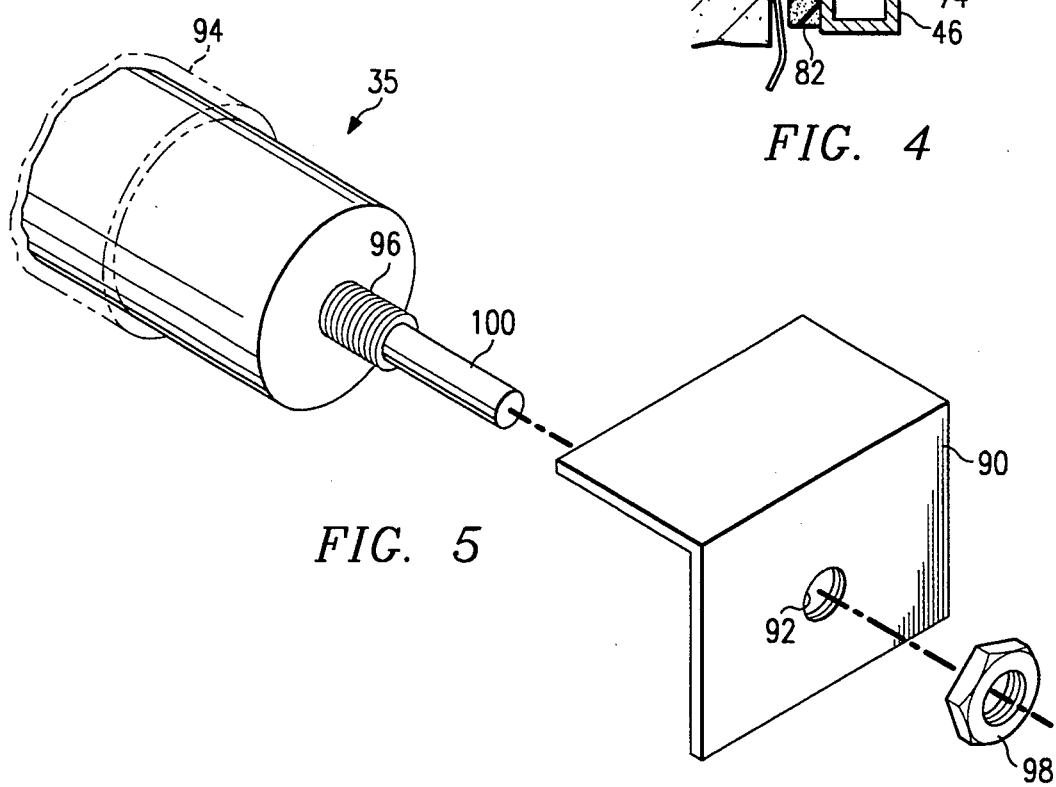
FIG. 5 is a partial isometric view of the pneumatic cylinder apparatus for fixing the filter within a collection box.
Figure 6:
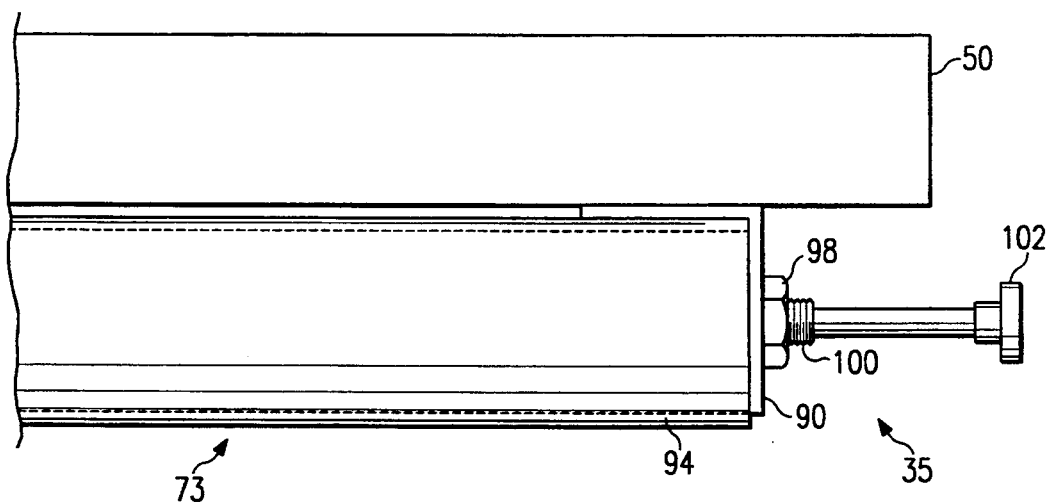
FIG. 6 is a side view of a pneumatic cylinder mounted to the filter frame of the invention.

FIGS. 5 and 6 illustrate the manner in which the pneumatic cylinders 35 are mounted to the filter frame of the invention. An angle bracket 90 having a threaded hole 92 therein is welded or otherwise fastened to the end cross member 50 of the filter bed and the cross member 62 of the telescopic section 52, as shown FIG. 3. Two other angle brackets are fastened to the frame members 46 and 48 adjacent the end to which the telescopic section 52 is inserted. By mounting the pairs of angle brackets at right angles with respect to each other, the filter frame 38 can be fixed with respect to the four sidewalls of the collection box 22. Welded to the vertical, inside face of the angle bracket 90 is a tubular pipe 94. The pipe 94 can also be welded to the frame members. The pipe 94 has an internal dimension slightly larger than an external diameter of the pneumatic cylinder 35 so that the cylinder can fit within the pipe 94. With this arrangement, the pipe 94 functions as a protective cover to prevent damage to the pneumatic cylinder 35 as the parts of the filter frame are inserted through the inlet 10 into the collection box 22.

As shown in FIG. 5, the pneumatic cylinder 35 is of the nose mounted type, having a threaded nose 96 that is engageable with the threaded hole 92 of the angle bracket 90. Once the pneumatic cylinder 35 is inserted in the pipe 94 and secured to the angle bracket 90, a nut 98 is secured to the corresponding nose 96 of the pneumatic cylinder 35, whereupon the pneumatic cylinder is fixed to the filter frame. Air forced into the pneumatic cylinder 35 by a valve (not shown) is effective to cause the plunger 100 to be extended. The end of the plunger 100 can be equipped with a foot 102 to provide a larger area of engagement with the sidewall of the collection box 22. By fastening the pneumatic cylinders 35 to the filter frame, assembly of the unit is facilitated and the filter system can be easily secured within the collection box 22.

While pneumatic cylinders are considered preferable, other means for urging the frame against the wall of the collection box are contemplated. For example, a mechanical jack can be utilized, or an over-the-center device that is expandable to accomplish the function. Alternatively, although less preferable, the front member 46 can be bolted to the wall of the collection box, using lag screws and suitable anchors.

During operation of the filter, drainage water and objects carried thereby enter the collection box 22 via the inlet 10. As can be appreciated in FIG. 1, the filter of the invention comprises a filter compartment, defined by the filter bed 40 and filter back 42, as well as a portion of the collection box sidewalls 32 and 34 and the front wall 28. Depending upon the size of the collection box 22, the filter compartment can be substantially large, thereby providing a large filter area for accommodating a large volume of drainage water. As noted above, with the dimensions of the filter frame 38 and the use of the woven filter material 80, a large area filter and a large flow rate can be realized. The woven filter material 80 removes substantially all of the objects carried by the drainage water, down to the size filtered by the material 80. Depending upon the size of the object to be filtered, different types of filter material 80 can be utilized. With the present governmental regulations, silt and sediment are not to be carried by the drainage water through the drain system outlet 24, but rather are to be removed. Accordingly, the woven material 80 of the type identified above is well suited for removing silt in compliance with the regulations. In order to prevent complete blockage of the storm drain, should the filter compartment become full, the drainage water can flow over the top of the filter back 42, as noted by the broken arrow in FIG. 1. The overflow can then pass unfiltered to the storm drain outlet 24, without rendering the storm drain inoperable or compromising the ability of the system to handle a large volume of drain water.

When it is desired to remove the debris collected in the filter compartment, the larger objects can first be removed manually through the storm drain inlet 10 or the access opening 18. Then, the compressed air in the pneumatic cylinders 35 can be released so that the edges of the filter material 80 folded around the filter bed 40 can be grasped and the entire filter material 80 removed from the collection box 22 with the debris contained therein. Because the woven filter material is inexpensive, new filter material can be efficiently installed on the filter frame 38 and screen. After removal of the debris, the filter frame can be refitted with new material and re-engaged with the front and sidewalls of the collection box 22 using the pneumatic cylinders in the manner noted above. As can be appreciated, if the filter frame is made integral with the collection box, the pneumatic cylinders are not required. Rather, the edges of the filter material 80 need only be securely attached to the sidewalls of the collection box front and sidewalls. This can be accomplished using bolts and a metal strip for pinching the filter material between the metal strip and the concrete sidewalls.

From the foregoing, the filter system of the invention can be easily adapted for use in presently existing storm drains without any modification thereto. To that end, the parts of the filter can be inserted through the opening of the inlet to the collection box, and assembled as a unit in the collection box. In addition, the filter system of tire invention is economical, easily installed and is capable of removing large volumes of very small particles from the drain water. The filter of the invention also has provisions for overflow, when the filter compartment is full, thereby preventing the storm drain from being rendered inoperable.

While the preferred and other embodiments of the invention have been disclosed with reference to specific filter apparatus and methods, it is to be understood that many changes in detail may be made as a matter of engineering choices without departing from the spirit and scope of the invention, as defined by the appended claims.

What is claimed is:

1. A filter system for a storm drain of the type having a collection box with an inlet for drainage water and an outlet for filtered water, comprising in combination:
   a collection box having at least one opening therein;
   a multipart frame for assembly in said collection box, said frame comprising plural parts that can each be passed through the opening in said collection box without disassembly of the collection box, and when assembled said frame is larger than said opening and cannot be passed as an integral unit through the opening;
   filter means for removing objects carried with the drainage water so that filtered water can flow out said collection box outlet, said filter means being supported by said frame as assembled in said collection box; and
   said frame and said filter means being arranged in said collection box so as to form a filter compartment for holding objects removed from the drainage water and to form an overflow so that when the filter compartment is full the drainage water can overflow within said collection box and flow as unfiltered drainage water out of said collection box outlet.

2. The filter system of claim 1, wherein said frame has a bed portion and an upright back portion and said filter means is supported by each said frame portion, and wherein a top of said back portion defines said overflow.

3. The filter system of claim 2, wherein said filter means comprises a coarse screen and a woven material for removing silt and other larger objects from the drainage water.

4. The filter system of claim 2, wherein said filter compartment includes at least one sidewall portion of the collection box and said bed portion and back portion of said frame.

5. The filter system of claim 1, further including means for urging said frame against a front sidewall of the collection box.

6. The filter system of claim 5, wherein said urging means comprises a pneumatic cylinder disposed between a back wall of the collection box and said frame to urge the frame against the front sidewall of the collection box.

7. The filter system of claim 1, wherein said frame comprises multiple parts for assembly in said collection box, including a back that is removable from a bed portion, and legs that are removable from said bed portion, and said bed portion comprises telescopic portions for expanding the length thereof.

8. The filter system of claim 1, wherein said collection box is an integral container having a top, bottom and four sidewalls connecting the top and bottom as an integral unit, and said collection box having no opening sufficiently large so as to allow an assembled said frame to be passed therethrough and into the collection box.

9. A method of filtering drainage water in an existing storm drain of the type having a collection box with a water inlet for receiving drainage water and an outlet for carrying filtered water, comprising the steps of:
   assembling plural parts of a multipart frame in the collection box;
   forming a filter compartment using said multipart frame within the collection box in a position so that drainage water is routed from the collection box inlet into the filter compartment;

providing the filter compartment with a filter medium for filtering the drainage water; and forming an overflow within said collection box by spacing a filter sidewall from a wall of the collection box so that when the filter compartment is full, the drainage water from the inlet flows over the top of the filter sidewall and downwardly in the space between the filter sidewall and the collection box wall to the outlet of the collection box.

10. The method of claim 9, further including sealing the filter to internal surfaces of the collection box by pinching a woven filter material between a frame supporting the filter material and the sidewall of the collection box.

11. The method of claim 10, further including telescoping said frame to fit snugly between opposing internal sidewalls of the collection box.

12. The method of claim 10, further including urging a front edge of a filter frame against the collection box by using an expandable device between the frame and the back wall of the collection box.

13. A filter system for use with a storm drain of the type having an existing collection box with an inlet for drainage water and an outlet for carrying filtered water, comprising:

a frame having a bed and a back removably attached together and being of a size for insertion through said inlet into said collection box and assembled therein, said frame further including legs removably attached to said bed for supporting the frame above a floor of the collection box;

a filter supported by the floor and back of the frame for filtering objects carried by the drainage water, said filter being removable from the collection box without removing the frame; and means for securing said frame in a predetermined position within the collection box.

14. The filter system of claim 13, wherein said bed is constructed so as to be extendable to accommodate different sizes of collection boxes.

15. The filter system of claim 14, wherein the bed of said frame is constructed of two sections, and further including means for telescoping one section with the other section so as to be extendable.

16. The filter system of claim 15, further including means for fixing the frame sections together in an extended position.

17. The filter system of claim 13, wherein said filter comprises a material for removing silt from the drainage water.

18. A filter system for a storm drain of the type having a collection box with an inlet for drainage water and an outlet for filtered water, comprising in combination:

a collection box;

a frame disposed in said collection box and being expandable to fit edge-to-edge within an internal lateral dimension of the collection box;

filter means for removing objects carried with the drainage water so that filtered water can flow out said outlet, said filter means being supported by said frame; and said frame and said filter means being arranged in said collection box so as to form a filter compartment for holding objects removed from the drainage water and to allow filtered water to flow through the filter means and out of said outlet.

19. The filter system of claim 18, wherein said frame is expandable to fit lengthwise between internal sidewalls of said collection box, and a frontal portion of said frame is adjacent a frontal wall of said collection box, and the back of said frame is spaced from a back wall of the collection box, said spacing for carrying overflow drainage water.

20. The filter system of claim 19, further including a seal disposed between walls of said collection box and said frame to prevent unfiltered drainage water from passing through said filter compartment without being filtered.

21. A storm drain filter system, comprising in combination:

a vaulted collection box of unitary construction having opposing sidewalls, a front wall and a back wall, all formed integral with a bottom and a top of the collection box, said collection box having a frontal inlet opening comprising an elongate rectangular opening having a width substantially greater than a height thereof, and an outlet located at a bottom portion of the collection box;

a portable filter frame being of a size for insertion in the collection box via the inlet opening, and extending substantially from one opposing sidewall to the other sidewall of the collection box, and abutted against the front wall of the collection box below the inlet opening;

said filter frame having an upright back portion spaced forwardly from the back wall of the collection box, said upright back portion of the filter frame and said front wall of the collection box defining a filter compartment for receiving drainage water from the inlet opening and directing the drainage water through a filter medium;

said filter medium comprising a rigid filter medium disposed on a filter frame portion defining a bottom of said filter compartment, said rigid filter medium having apertures functioning to filter the drainage water;

an overflow area defined by a space between the upright back portion of the filter frame and the back wall of the collection box; and a plurality of supports for supporting the filter frame above the floor of the collection box so that the drainage water first flows through the rigid filter medium and when said filter compartment is full of debris, the drainage water flows over the upright back portion of the filter frame down the overflow area and is carried out of the outlet of the collection box.

22. The storm drain filter system of claim 21, wherein said plurality of supports comprise legs.

23. The storm drain filter system of claim 21, further including a flexible filter material disposed over said rigid filter medium to filter fine debris.

* * * * *